United States Patent
Liu et al.

(10) Patent No.: US 9,811,679 B2
(45) Date of Patent: Nov. 7, 2017

(54) ELECTRONIC SYSTEM WITH ACCESS MANAGEMENT MECHANISM AND METHOD OF OPERATION THEREOF

(71) Applicant: Samsung Electronics Co., Ltd., Suwon-si, Gyeonggi-Do (KR)

(72) Inventors: Bin Liu, Sunnyvale, CA (US); Hongxia Jin, San Jose, CA (US); Na Wang, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 15 days.

(21) Appl. No.: 14/585,723

(22) Filed: Dec. 30, 2014

(65) Prior Publication Data

US 2016/0188895 A1    Jun. 30, 2016

(51) Int. Cl.
*G06F 21/62* (2013.01)
*G06N 99/00* (2010.01)

(52) U.S. Cl.
CPC ....... *G06F 21/6218* (2013.01); *G06N 99/005* (2013.01); *G06F 2221/2111* (2013.01)

(58) Field of Classification Search
CPC .......................... G06F 21/6218; G06N 99/005
USPC .......................................................... 726/17
See application file for complete search history.

(56) References Cited

U.S. PATENT DOCUMENTS

| | | | |
|---|---|---|---|
| 5,555,376 A | 9/1996 | Theimer et al. | |
| 5,603,054 A | 2/1997 | Theimer et al. | |
| 5,611,050 A | 3/1997 | Theimer et al. | |
| 5,717,955 A | 2/1998 | Swinehart | |
| 6,061,684 A * | 5/2000 | Glasser et al. | |
| 9,112,866 B2 | 8/2015 | Carrara | |
| 9,411,967 B2 | 8/2016 | Parecki | |
| 2001/0056545 A1* | 12/2001 | Takechi et al. | 713/200 |
| 2003/0084087 A1* | 5/2003 | Berry | 709/102 |
| 2011/0279842 A1* | 11/2011 | Abe et al. | 358/1.13 |
| 2011/0283242 A1* | 11/2011 | Chew | G06F 17/30994 715/863 |
| 2012/0030556 A1* | 2/2012 | Cohen et al. | 715/221 |
| 2012/0222083 A1 | 8/2012 | Vähä-Sipilä | |
| 2013/0014279 A1 | 1/2013 | Leland | |
| 2013/0205385 A1 | 8/2013 | Roesner | |
| 2013/0232540 A1 | 9/2013 | Saidi et al. | |
| 2013/0239223 A1 | 9/2013 | Park et al. | |
| 2014/0033226 A1* | 1/2014 | Glazer | G06F 9/542 719/311 |
| 2014/0068549 A1* | 3/2014 | Friedman et al. | 717/104 |
| 2015/0220317 A1* | 8/2015 | Li et al. | 717/104 |
| 2015/0271207 A1* | 9/2015 | Jaiswal | G06F 21/10 726/1 |

\* cited by examiner

*Primary Examiner* — Amir Mehrmanesh
*Assistant Examiner* — Sakinah Taylor
(74) *Attorney, Agent, or Firm* — IP Investment Law Group

(57) ABSTRACT

An electronic system includes: a control unit configured to operate on a user interface; and the user interface, coupled to the control unit, configure to: present an application coupled to an access configuration to customize a permission level for a service type, and receive an input for changing the permission level of the service type for accessing a resource type for customizing an operation of the application on a device.

23 Claims, 10 Drawing Sheets

ELECTRONIC SYSTEM WITH ACCESS MANAGEMENT MECHANISM AND METHOD OF OPERATION THEREOF

TECHNICAL FIELD

An embodiment of the present invention relates generally to an electronic system, and more particularly to a system for access management mechanism.

BACKGROUND

Modern portable consumer and industrial electronics, especially client devices such as electronic systems, cellular phones, portable digital assistants, and combination devices are providing increasing levels of functionality to support modern life including location-based information services. Research and development in the existing technologies can take a myriad of different directions.

Personalized content services allow users to create, transfer, store, and/or consume information in order for users to create, transfer, store, and consume in the "real world." One such use of personalized content services is to efficiently transfer or guide users to the desired product or service.

Electronic system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

However, an electronic system improving access management mechanism to customize system access has become a paramount concern for the consumer. The inability decreases the benefit of using the tool.

Thus, a need still remains for an electronic system with access management mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including: a control unit (812) configured to operate on a user interface; and the user interface, coupled to the control unit, configure to: present an application coupled to an access configuration to customize a permission level for a service type, and receive an input for changing the permission level of the service type for accessing a resource type for customizing an operation of the application on a device.

An embodiment of the present invention provides a method of operation of an electronic system including: presenting an application coupled to an access configuration with a control unit to customize a permission level for a service type; and receiving an input for changing the permission level of the service type for accessing a resource type for customizing an operation of the application on a device.

An embodiment of the present invention provides a non-transitory computer readable medium including instructions for execution by a control unit including: presenting an application coupled to an access configuration to customize a permission level for a service type; and receiving an input for changing the permission level of the service type for accessing a resource type for customizing an operation of the application on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
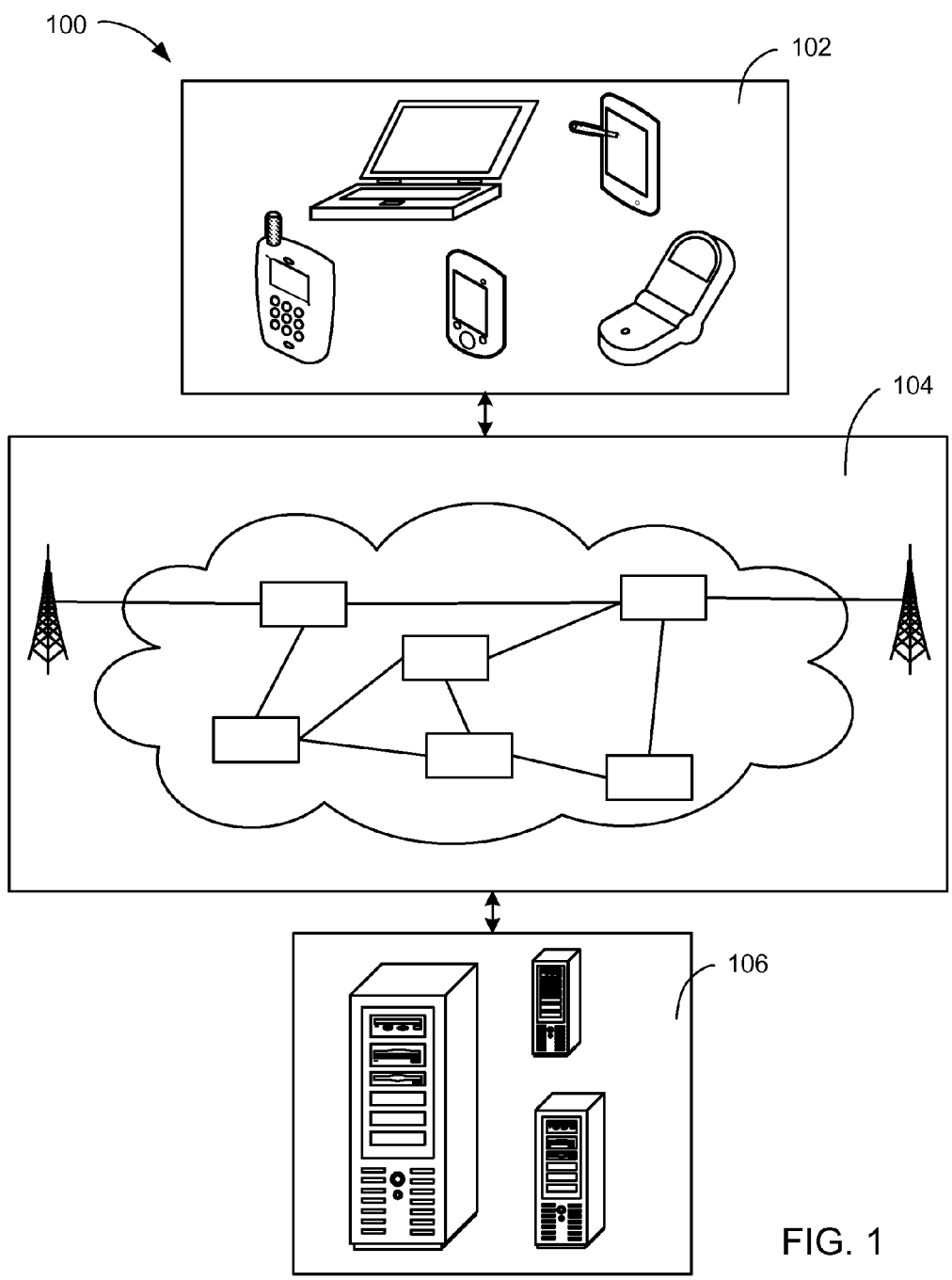
FIG. 1 is an electronic system with access management mechanism in an embodiment of the present invention.

One embodiment of the present invention operates a user interface to present an application including an access configuration to customize a permission level for a service type. By presenting the access configuration, an electronic system can receive an input for changing the permission level of the service type for accessing a resource type to customize an operation of the application on a device. As a result, the electronic system can improve the control of the service type accessing the resource type to improve the user's privacy for operating a first device, the electronic system, or a combination thereof.

One embodiment of the present invention generates a replacement component based on permission level to access the resource type to improve the user's privacy for operating the first device, the electronic system, or a combination thereof. By generating the replacement component, the electronic system can execute the replacement component instead of original functionality component to access the resource type. As a result, the electronic system can provide a replacement notification, a fake information, or a combination thereof for protecting the user's privacy for safer operation of the first device, the electronic system, or a combination thereof.

The embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention.

However, it will be apparent that the invention may be practiced without these specific details. In order to avoid obscuring the embodiments of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with access management mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, wearable digital device, tablet, notebook computer, television (TV), automotive telematic communication system, or other multi-functional mobile communication or entertainment device. The first device 102 can be a standalone device, or can be incorporated with a vehicle, for example a car, truck, bus, aircraft, boat/vessel, or train. The first device 102 can couple to the communication path 104 to communicate with the second device 106.

For illustrative purposes, the electronic system 100 is described with the first device 102 as a display device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can couple with the communication path 104 to communicate with the first device 102. The second device 106 can also be a client type device as described for the first device 102.

In another example, the first device 102 can be a particularized machine, such as a mainframe, a server, a cluster server, a rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, a personal digital assistant, or a cellular phone, and as specific examples, an Apple iPhone™, Android™ smartphone, or Windows™ platform smartphone.

For illustrative purposes, the electronic system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
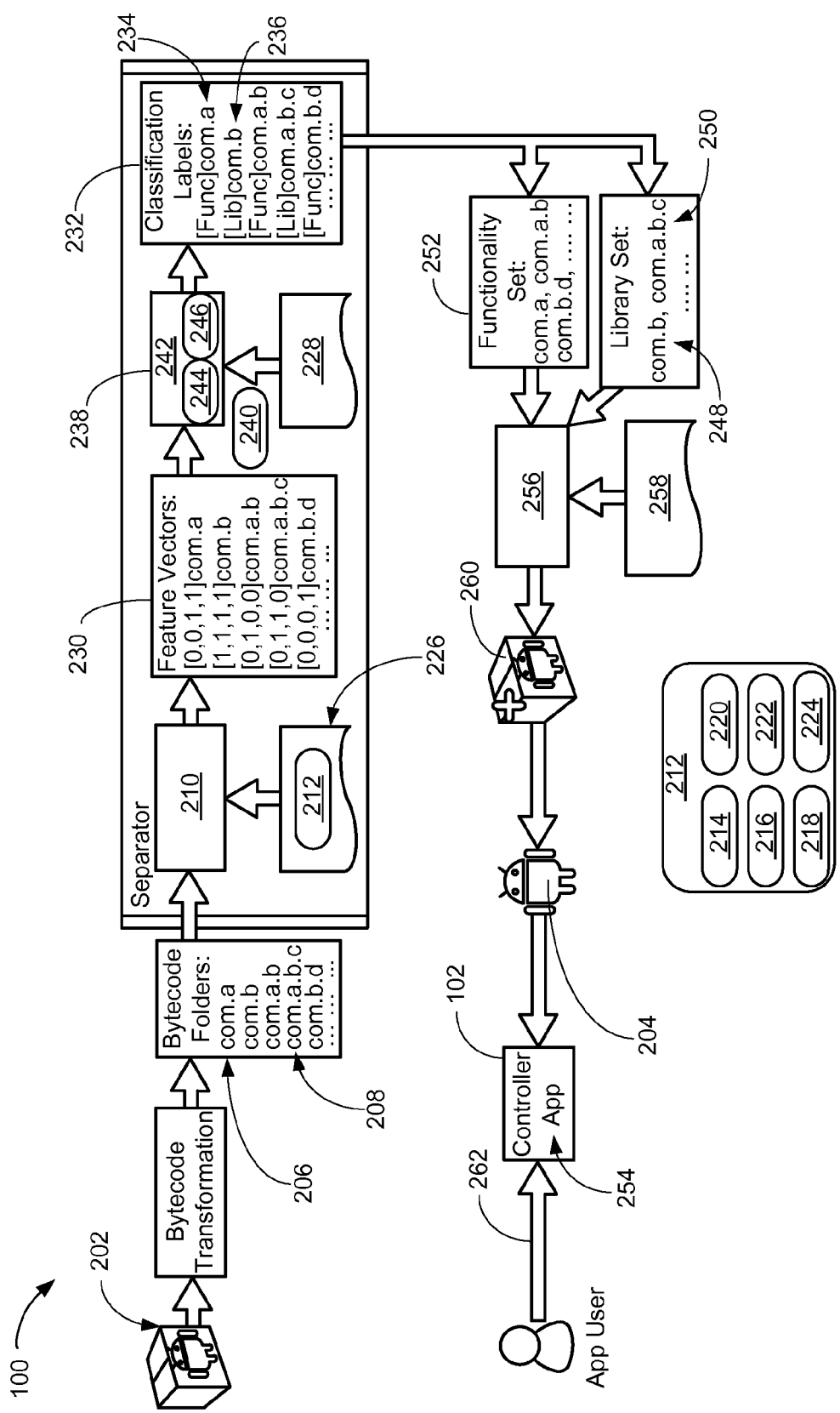
FIG. 2 is an example of an architecture flow of the electronic system.

Referring now to FIG. 2, therein is shown an example of an architecture flow of the electronic system 100. For clarity and brevity, the discussion of the present invention will focus on the first device 102 presenting the result generated by the electronic system 100. However, the second device 106 of FIG. 1 and the first device 102 can be discussed interchangeably.

The architecture flow can include a package file 202. The package file 202 is an archive file for installing an application 204 on the first device 102. The package file 202 can include a jar file, an iOS App Store Package, a tar file, a zip file, or a combination thereof. The application 204 is software or computer program running on a device. For example, the application 204 can represent an Android™ app running on the first device 102 representing an Android™ phone. The first control unit 812 of FIG. 8, the second control unit 834 of FIG. 8, or a combination thereof can execute the application 204.

The package file 202 can include a file directory 206, a file folder 208, or a combination thereof. The file directory 206 is a data structure organizing the file folder 208. The file folder 208 is a digital object capable of holding a plurality of a content. The content can include binary file, text file, markup language file, such as HyperText Markup Language (HTML) or Extensible Markup Language (XML) file, image file, an executable code, or a combination thereof. One instance of the file folder 208 can include another instance of the file folder 208 forming the file directory 206. For example, the file directory 206 including the file folder 208 can represent the bytecode folders.

The application 204 can include a feature 210 in the file directory 206, the file folder 208, or a combination thereof. The feature 210 is a non-volatile resource of the application 204. For example, the application 204 can perform foregoing actions including access, use, implement, or a combination thereof to a system component 212 with the feature 210. The system component 212 is a non-volatile resource of an operating system. For example, the operating system can include Android™, iOS™, Windows™, Linux, UNIX, or a combination thereof.

The feature 210 can include a frontend feature, and background feature, or a combination thereof. For example, the application 204 can be built for the Android™ platform. More specifically as an example, the background feature can maintain a long lasting thread even if the application 204 has already quitted from the foreground. If the feature 210 implements the long lasting thread function, then the feature 210 can be identified as the background feature. For a different example, the background feature cannot include the user interface element. If the feature 210 implements the user interface element, then the feature 210 can be identified as the frontend feature.

The system component 212 can include a basic component 214, a permission component 216, a visual component 218, a source and sink component 220, a runtime permission check component 222, a keyword nomenclature 224, or a combination thereof. The basic component 214 provides access to the basic service offered by the operating system. For example, the basic component 214 can include activity, service, content provider, broadcast receiver, or a combination thereof for the operating system representing Android™.

The permission component 216 provides access to service that require permission from the operating system. For example, the permission component 216 can include INTERNET, ACCESS_NETWORK_STATE, ACCESS_WIFI_STATE, ACCESS_COARSE_LOCATION, ACCESS_FINE_LOCATION, WRITE_EXTERNAL_STORAGE, or a combination thereof for the operating system representing Android™.

The visual component 218 provides access to display functionality offered by the operating system. For example, the visual component 218 can provide access to user interface (UI) widget offered by the operating system.

The source and sink component 220 provides input point and output point of information. For example, the information source can refer to a system call that reads non-constant information from a shared resource. The information sink can refer to a system call that writes a piece of information to the shared resource.

The runtime permission check component 222 provides a service to dynamically check permission from the operating system. The file directory 206 of the application 204 can call the runtime permission check component 222 through the application program interface.

The keyword nomenclature 224 is naming information. The naming information can include pronoun, brand name, entity name, user defined word, or a combination thereof. For example, the keyword nomenclature 224 can provide the unique name, such as Facebook™ or Amazon™. The unique name can be used as a part of the naming for object included in the file folder 208, such as class, method, field name, or a combination thereof.

The electronic system 100 can extract the feature 210 defined in a feature definition 226. The feature definition 226 is information regarding the feature 210 performing foregoing actions including accessing, using, implementing, or a combination thereof to a specific type of the system component 212. The feature definition 226 can include the feature 210 performing foregoing actions including accessing, using, implementing, or a combination thereof to the system component 212 including, for example, the basic component 214, the permission component 216, the visual component 218, the source and sink component 220, the runtime permission check component 222, the keyword nomenclature 224, or a combination thereof.

The electronic system 100 can compare the feature 210 to a training data 228 to calculate a feature vector 230 of the file directory 206, the file folder 208, or a combination thereof. The training data 228 is the feature 210 that is already classified. For example, the feature 210 in the training data 228 can be classified according to a service type 232.

The service type 232 can include a functionality component 234, a third party component 236, or a combination thereof. The functionality component 234 is a non-volatile resource original to the application 204. For example, the functionality component 234 can include a software process that executes on the first device 102.

The third party component 236 is a non-volatile resource provided by the external source to be implemented in the application 204 along with the functionality component 234. For example, the third party component 236 can represent a library for social network, advertisement, or a combination thereof. The library can represent a collection of non-volatile resources used by the application 204. The third party component 236 can include a software service that can execute on the first device 102.

More specifically as an example, the third party component 236 can represent the software service to be integrated into the first device 102 to facilitate a process of component oriented development. In the Android™ ecosystem, there are many types of the third party component 236 including Social SDKs, such as Facebook™, Twitter4j™ and WeChat™, to allow developers to integrate popular social elements to the application 204. The third party component 236 representing the Ad libraries can be bundled with the functionality component 234 to provide revenue stream for the developers of the application 204.

For further example, the service type 232 can in include a frontend service, and background service, or a combination thereof. For example, the application 204 can be built for the Android™ platform. More specifically as an example, the background service can maintain a long lasting thread even if the application 204 has already quitted from the foreground. If the service type 232 implements the long lasting thread function, then the service type 232 can be identified as the background service. For a different example, the background service can not include the user interface element. If the service type 232 implements the user interface element, then the service type 232 can be identified as the frontend service.

The feature vector 230 is statistical information. For example, the feature vector 230 can indicate the numerical value of the file directory 206, the file folder 208, or a combination thereof representing a degree of association to the service type 232. For example, based on the number of instances of the feature 210 matching the training data 228 with the certain instance of the service type 232, the file directory 206, the file folder 208, or a combination thereof can also be classified as the same instance of the service type 232.

A folder classification 238 is an indication of a group to which the file directory 206, the file folder 208, or a combination thereof is categorized. For example, the file folder 208 can be classified to indicate that the folder classification 238 represents the functionality component 234. For another example, the file folder 208 can be classified to indicate that the folder classification 238 represents the third party component 236.

The folder classification 238 can be classified based on comparing the feature vector 230 to a vector threshold 240. The vector threshold 240 is a minimum value of the feature vector 230 for classification. The vector threshold 240 can be set for each instance of the service type 232.

The folder classification 238 can be categorized according to a classification type 242. The classification type 242 is a categorization of the folder classification 238. The classification type 242 can include a binary classification 244, a multiclass classification 246, or a combination thereof.

The binary classification 244 is categorizing the file directory 206, the file folder 208, or a combination thereof into two different categories. For example, the file folder 208 can be either categorized as the functionality component 234 or the third party component 236 according to the binary classification 244. The multiclass classification 246 is categorizing the file directory 206, the file folder 208, or a combination thereof into more than two different categories. For example, the file folder 208 can be categorized as the functionality component 234, the third party component 236 including a notification component 248 and/or a non-notification component 250, or a combination thereof according to the multiclass classification 246.

The notification component 248 can represent the third party component 236 providing advertisement. The notification component 248 can represent Google™ ad library. The non-notification component 250 can represent the third party component 236 unrelated to advertisement. The non-notification component 250 can represent non-Google™ ad library.

A component set 252 is classified collection of the file directory 206, the file folder 208, or a combination thereof. For example, one instance of the component set 252 can include the file directory 206, the file folder 208, or a combination thereof classified with the folder classification 238 representing the functionality component 234. For a different example, another instance of the component set 252 can include the file directory 206, the file folder 208, or a combination thereof classified with the folder classification 238 representing the third party component 236.

The component set 252 can be rewritten to include a replacement component 256. The replacement component 256 is a modified version of a non-volatile resource. The replacement component 256 can be generated according to a resource type 258, which is a classification of the system component 212.

The resource type 258 can be accessed by a uniform resource identifier (URI). For example, the URI can include "content://com.android.contacts" or "content://contacts," for the resource type 258 of user's contacts stored in the first device 102. If the URI is "content://call_log," then the resource type 258 can represent call logs logged in the first device 102. And if the URI is "content://com.android.calendar," then the resource type 258 can represent calendar in the first device 102.

A repackage file 260 is an archive file repackaged to include the replacement component 256. For example, the repackage file 260 can include the functionality component 234, the third party component 236, the replacement component 256, or a combination thereof.

The user of the electronic system 100 can manipulate a permission level 262 to granularly control the accessibility to the system component 212 by the functionality component 234, the third party component 236, or a combination thereof. The permission level 262 is a degree of permission. For example, the permission level 262 can represent "lock" or "unlock" the system component 212 to allow the functionality component 234, the third party component 236, or a combination thereof to access the system component 212 or not. The user can manipulate the permission level 262 from a control interface 254 on the first device 102.

The control interface 254 can represent a user interface. The control interface 254 can be utilized during installation and runtime. More specifically as an example, the control interface 254 can run independent from the application 204. The control interface 254 can be integrated with the application 204 for different example.

For further example, the user can manipulate from the control interface 254 to change the permission level 262 during an installation of the application 204 that has been repackaged. For another example, the user can manipulate from the control interface 254 to change the permission level 262 for the application 204 that has been repackaged during runtime of the application 204.

For further example, by controlling the resource type 258 that is accessible, the electronic system 100 can horizontally expand the control of the access to the resource type 258. More specifically as an example, the component set 252 including the functionality component 234 can access the resource type 258 without any limitation. In contrast, the electronic system 100 can limit the access to the resource type 258 by the component set 252 classified as the third party component 236.

Figure 3:
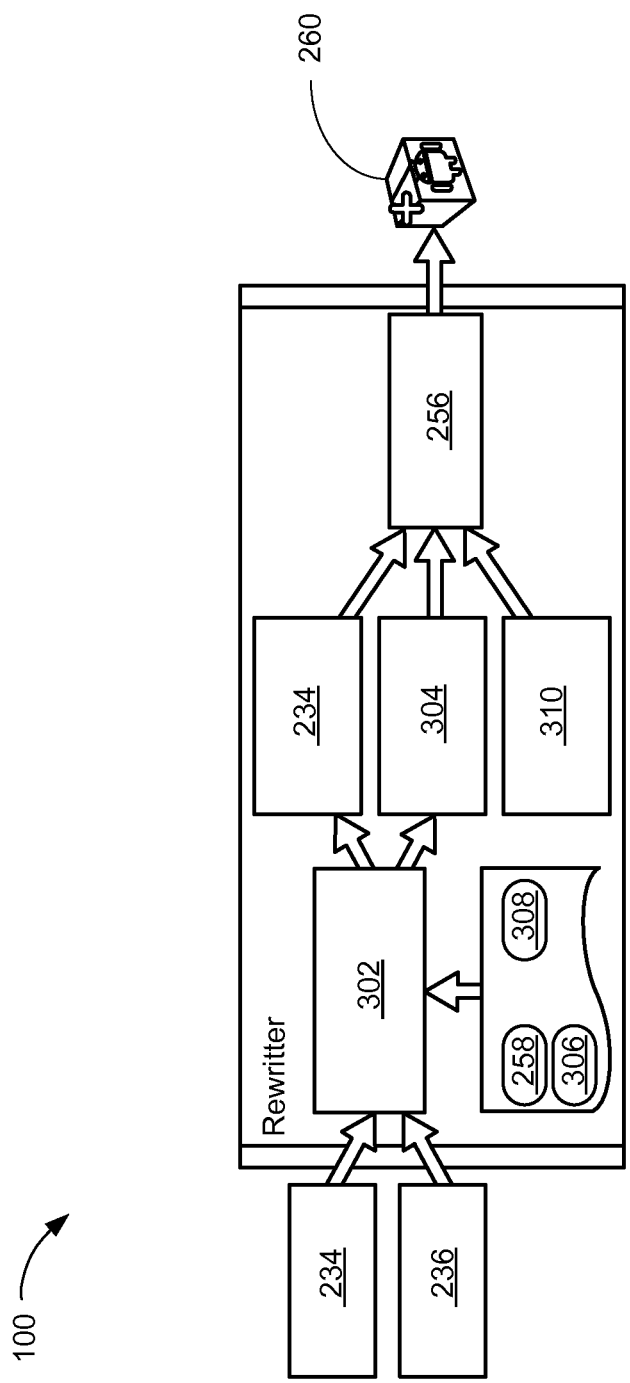
FIG. 3 is a first example of a replacement type.

Referring now to FIG. 3, therein is shown a first example of a replacement type 302. The replacement type 302 is a classification of non-volatile resource replacing the third party component 236.

The replacement type 302 can include a wrapper function 304. The wrapper function 304 is a replacement process. For example, the wrapper function 304 can represent a software process that replaces the software process of the third party component 236.

The electronic system 100 can generate the wrapper function 304 based on the resource type 258, a resource subtype 306, or a combination thereof. The resource subtype 306 is a further classification of the system component 212. More specifically as an example, the resource subtype 306 can represent the further classification of the resource type 258. For a specific example, the resource type 258 can represent a physical location. The resource subtype 306 can represent the longitude latitude coordinate of the physical location.

A blacklist 308 is information regarding data unpermitted to transfer from the functionality component 234 to the third party component 236. For example, the blacklist 308 can represent information representing function signature. For further example, the blacklist 308 can represent information regarding data included in the resource type 258, the resource subtype 306, or a combination thereof that is unpermitted to be transferred between the functionality component 234 and the third party component 236.

A non-essential component 310 can represent a non-volatile resource undefined in the feature definition 226 of FIG. 2. The non-essential component 310 can be repackaged with the functionality component 234, the third party component 236, the replacement component 256, or a combination thereof as part of the repackage file 260.

Figure 4:
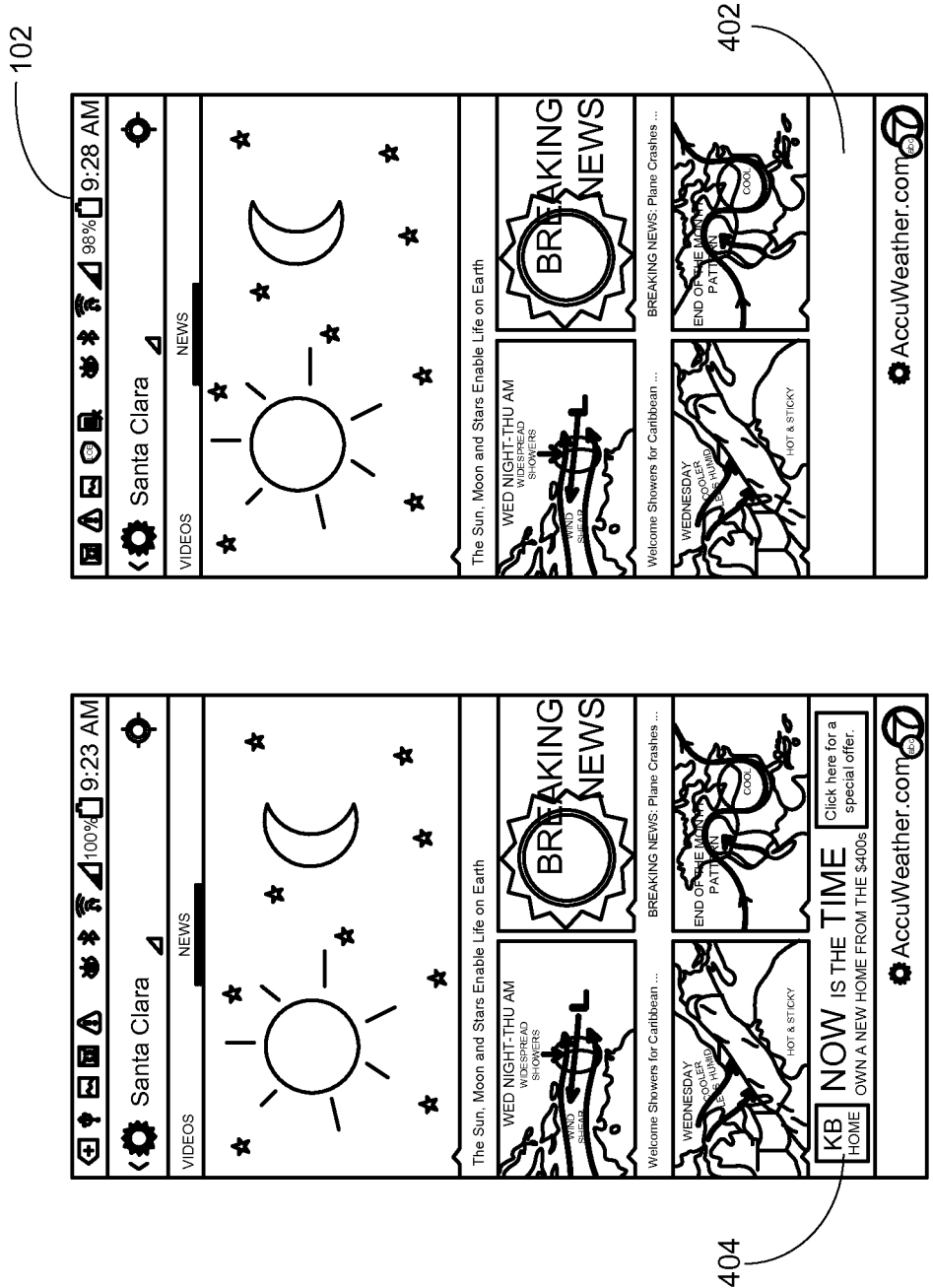
FIG. 4 is a second example of the replacement type of FIG. 3.

Referring now to FIG. 4, therein is shown a second example of the replacement type 302 of FIG. 3. The replacement type 302 can include a replacement notification 402. The replacement notification 402 is presentable information that replaces an external notification 404. The external notification 404 is presentable information provided by a third party provider. The third party provider can represent an advertisement provider, publisher, broker, or a combination thereof.

For example, the external notification 404 can represent an advertisement for a real estate brokerage firm, such as KB HOME™. The third party provider can provide the external notification 404 to be presented on the first device 102.

The replacement notification 402 can represent a blank content, a different content, or a combination thereof to replace the external notification 404. In FIG. 4, the replacement notification 402 can represent the blank content to replace the external notification 404. More specifically as an example, instead of seeing the advertisement of KB HOME™, the user can see a black section on the first device 102.

Figure 5:
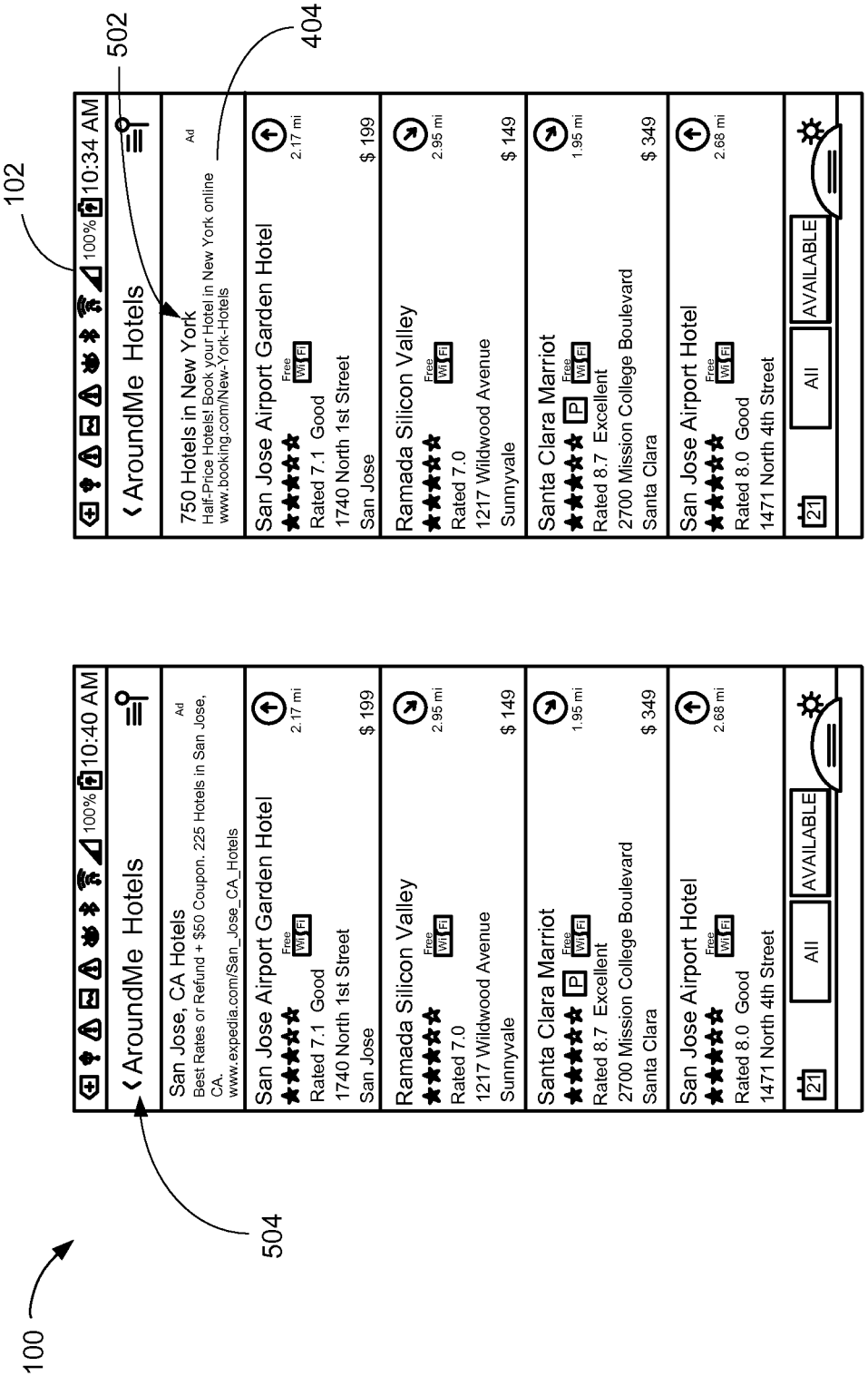
FIG. 5 is a third example of the replacement type of FIG. 3.

Referring now to FIG. 5, therein is shown a third example of the replacement type 302 of FIG. 3. The replacement type 302 can include a fake information 502. The fake information 502 is a bogus information. The fake information 502 can be part of the external notification 404.

More specifically as an example, if the third party provider obtained the information for the physical location of the first device 102 based on the access to the resource type 258 of FIG. 2 representing location via the third party component 236 of FIG. 2, the third party provider can provide the external notification 404 relevant to the location of the first device 102. For a specific example, the location of the first device 102 can represent San Jose, Calif. The third party provider can present the external notification 404 representing an advertisement for hotel in San Jose, Calif.

Instead, the electronic system 100 can provide the fake information 502 via the third party component 236 to the third party provider. The fake information 502 can represent a physical location irrelevant to the current location of the first device 102. For example, the fake information 502 can represent New York City, N.Y. Based on the fake information 502, the third party provider can provide the external notification 404 representing an advertisement for hotels in New York City, N.Y. instead of San Jose, Calif.

A context 504 is situation or circumstance surrounding the first device 102. For example, the context 504 can represent the circumstance that the user is in operating the first device 102. For example, the context 504 can include user's location, the time of day, week, month, year, season, or a combination thereof. The context 504 can also include whether user is traveling or not.

Figure 6:
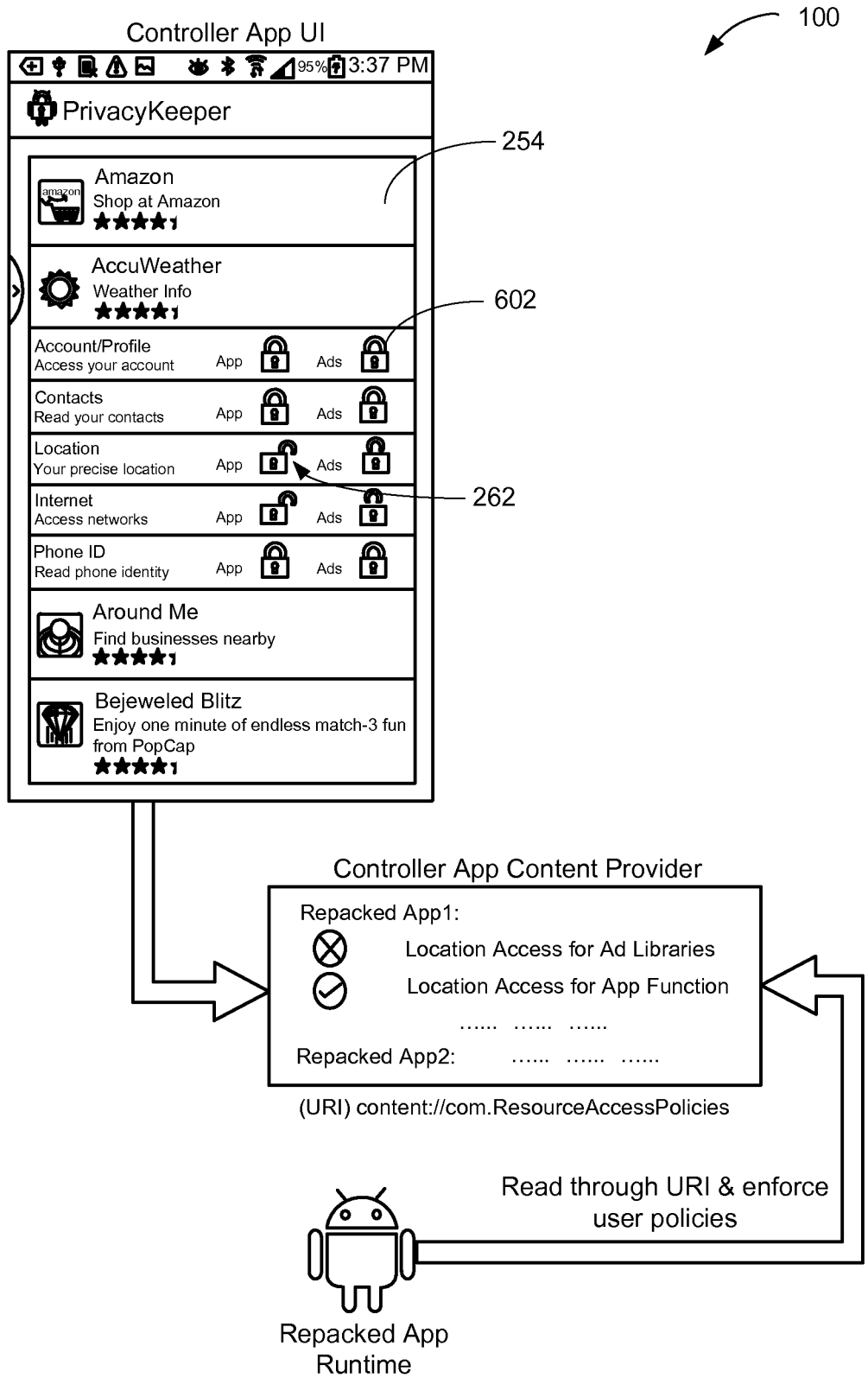
FIG. 6 is a first example of the control interface.

Referring now to FIG. 6, therein is shown a first example of the control interface 254. The control interface 254 can include an access configuration 602. The access configuration 602 is an interface to change the permission level 262. For example, the electronic system 100 can change the permission level 262 with the access configuration 602.

For a specific example, the permission level 262 to access the resource type 258 of FIG. 2, the resource subtype 306 of FIG. 3, or a combination thereof by the third party component 236 of FIG. 2 can be "lock" or "unlock." More specifically as an example, the access configuration 602 can lock the third party component 236 repackaged in the repackage file 260 of FIG. 2 of the application 204 of FIG. 2 from accessing the resource type 258 representing location. In contrast, the functionality component 234 repackaged in the repackage file 260 of the application 204 can still access the resource type 258 representing location.

Figure 7:
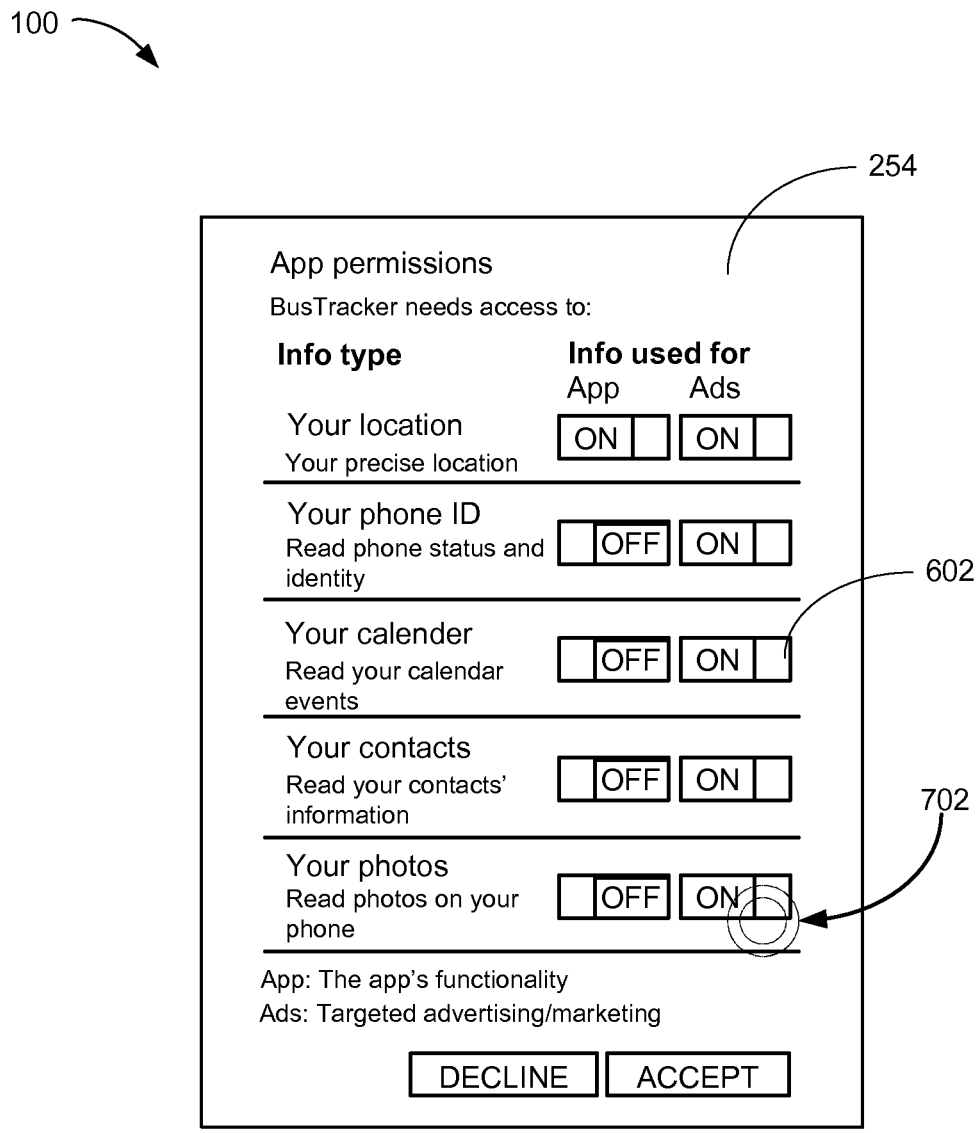
FIG. 7 is a first example of the control interface.

Referring now to FIG. 7, therein is shown a second example of the control interface 254. The control interface 254 can include a different illustration of the access configuration 602.

For example, the access configuration 602 can represent an "on" or "off" switch. More specifically as an example, the electronic system 100 can control the access to the resource type 258 of FIG. 2, the resource subtype 306 of FIG. 3, or a combination thereof with the access configuration 602 to permit or prohibit the functionality component 234 of FIG. 2, the third party component 236 of FIG. 2, or a combination thereof from accessing the resource type 258.

For further example, the control interface 254 can accept an input 702. The input 702 can include a manual input, an audio input, gesture, or a combination thereof.

Figure 8:
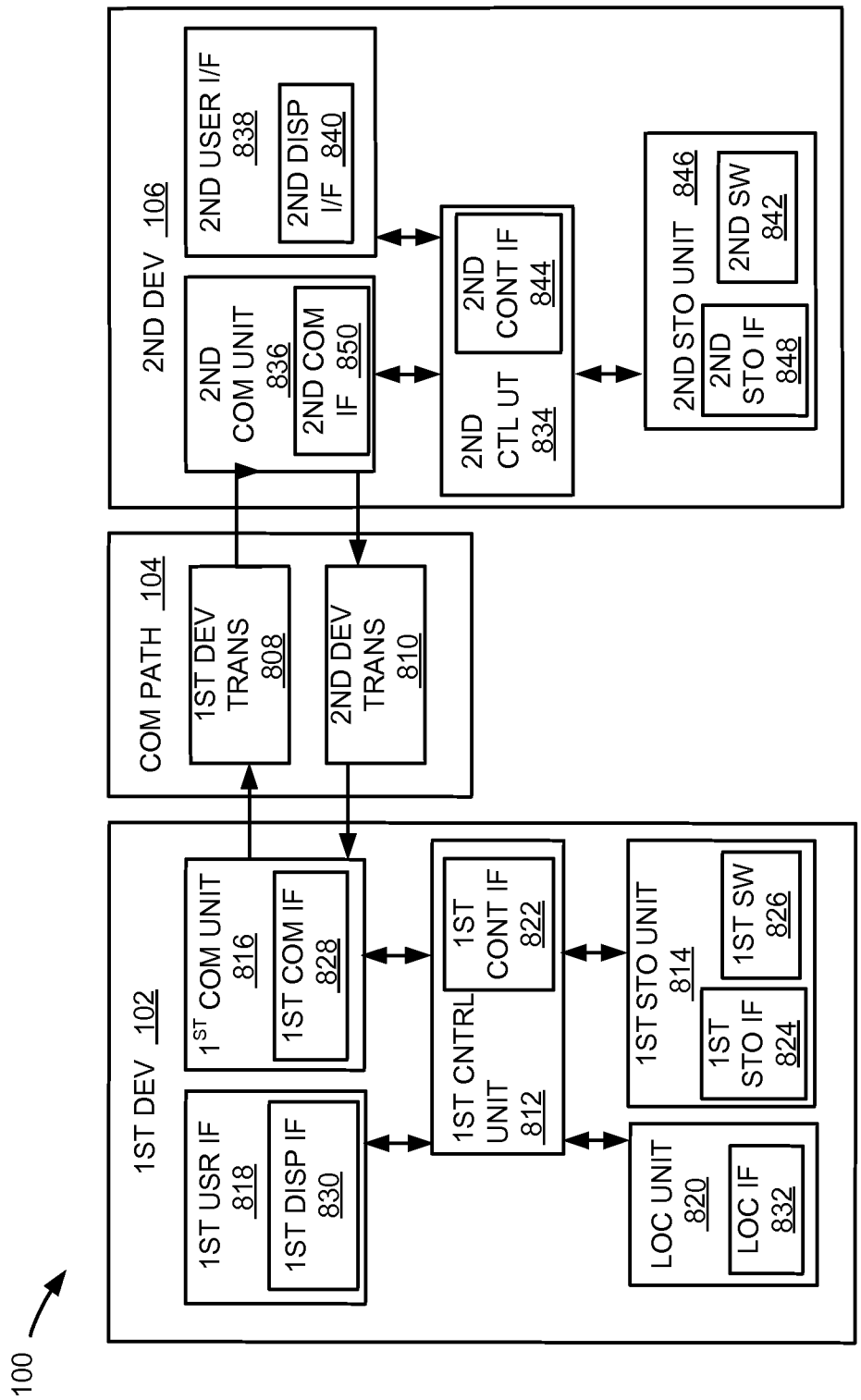
FIG. 8 is an exemplary block diagram of the electronic system.

Referring now to FIG. 8, therein is shown an exemplary block diagram of the electronic system 100. The electronic system 100 can include the first device 102, the communication path 104, and the second device 106. The first device 102 can send information in a first device transmission 808 over the communication path 104 to the second device 106. The second device 106 can send information in a second device transmission 810 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 812, a first storage unit 814, a first communication unit 816, a first user interface 818, and a location unit 820. The first control unit 812 can include a first control interface 822. The first control unit 812 can execute a first software 826 to provide the intelligence of the electronic system 100.

The first control unit 812 can be implemented in a number of different manners. For example, the first control unit 812 can be a processor, an application specific integrated circuit (ASIC) an embedded processor, a microprocessor, a hardware control logic, a hardware finite state machine (FSM), a digital signal processor (DSP), or a combination thereof. The first control interface 822 can be used for communication between the first control unit 812 and other functional units in the first device 102. The first control interface 822 can also be used for communication that is external to the first device 102.

The first control interface 822 can receive information from the other functional units or from external sources, or can transmit information to the other functional units or to external destinations. The external sources and the external destinations refer to sources and destinations physically separate from to the first device 102.

The first control interface 822 can be implemented in different ways and can include different implementations depending on which functional units or external units are being interfaced with the first control interface 822. For example, the first control interface 822 can be implemented with a pressure sensor, an inertial sensor, a microelectromechanical system (MEMS), optical circuitry, waveguides, wireless circuitry, wireline circuitry, or a combination thereof.

The location unit 820 can generate location information, current heading, and current speed of the first device 102, as examples. The location unit 820 can be implemented in many ways. For example, the location unit 820 can function as at least a part of a global positioning system (GPS), an inertial navigation system, a cellular-tower location system, a pressure location system, or any combination thereof.

The location unit 820 can include a location interface 832. The location interface 832 can be used for communication between the location unit 820 and other functional units in the first device 102. The location interface 832 can also be used for communication that is external to the first device 102.

The location interface 832 can receive information from the other functional units or from external sources, or can transmit information to the other functional units or to external destinations. The external sources and the external destinations refer to sources and destinations physically separate from the first device 102.

The location interface 832 can include different implementations depending on which functional units or external units are being interfaced with the location unit 820. The location interface 832 can be implemented with technologies and techniques similar to the implementation of the first control interface 822.

The first storage unit 814 can store the first software 826. The first storage unit 814 can also store the relevant information, such as advertisements, points of interest (POI), navigation routing entries, or any combination thereof. The relevant information can also include news, media, events, or a combination thereof from the third party content provider.

The first storage unit 814 can be a volatile memory, a nonvolatile memory, an internal memory, an external memory, or a combination thereof. For example, the first storage unit 814 can be a nonvolatile storage such as non-volatile random access memory (NVRAM), Flash memory, disk storage, or a volatile storage such as static random access memory (SRAM).

The first storage unit 814 can include a first storage interface 824. The first storage interface 824 can be used for communication between and other functional units in the first device 102. The first storage interface 824 can also be used for communication that is external to the first device 102.

The first storage interface 824 can receive information from the other functional units or from external sources, or can transmit information to the other functional units or to external destinations. The external sources and the external destinations refer to sources and destinations physically separate from the first device 102.

The first storage interface 824 can include different implementations depending on which functional units or external units are being interfaced with the first storage unit 814. The first storage interface 824 can be implemented with technologies and techniques similar to the implementation of the first control interface 822.

The first communication unit 816 can enable external communication to and from the first device 102. For example, the first communication unit 816 can permit the first device 102 to communicate with the second device 106 of FIG. 1, an attachment, such as a peripheral device or a computer desktop, and the communication path 104.

The first communication unit 816 can also function as a communication hub allowing the first device 102 to function as part of the communication path 104 and not limited to be an end point or terminal unit to the communication path 104. The first communication unit 816 can include active and passive components, such as microelectronics or an antenna, for interaction with the communication path 104.

The first communication unit 816 can include a first communication interface 828. The first communication interface 828 can be used for communication between the first communication unit 816 and other functional units in the first device 102. The first communication interface 828 can receive information from the other functional units or can transmit information to the other functional units.

The first communication interface 828 can include different implementations depending on which functional units are being interfaced with the first communication unit 816. The first communication interface 828 can be implemented with technologies and techniques similar to the implementation of the first control interface 822.

The first user interface 818 allows a user (not shown) to interface and interact with the first device 102. The first user interface 818 can include an input device and an output device. Examples of the input device of the first user interface 818 can include a keypad, a touchpad, soft-keys, a keyboard, a microphone, an infrared sensor for receiving remote signals, or any combination thereof to provide data and communication inputs.

The first user interface 818 can include a first display interface 830. The first display interface 830 can include a display, a projector, a video screen, a speaker, or any combination thereof.

The first control unit 812 can operate the first user interface 818 to display information generated by the electronic system 100. The first control unit 812 can also execute the first software 826 for the other functions of the electronic system 100, including receiving location information from the location unit 820. The first control unit 812 can further execute the first software 826 for interaction with the communication path 104 via the first communication unit 816.

The second device 106 can be optimized for implementing the embodiment of the present invention in a multiple device embodiment with the first device 102. The second device 106 can provide the additional or higher performance processing power compared to the first device 102. The second device 106 can include a second control unit 834, a second communication unit 836, and a second user interface 838.

The second user interface 838 allows a user (not shown) to interface and interact with the second device 106. The second user interface 838 can include an input device and an output device. Examples of the input device of the second user interface 838 can include a keypad, a touchpad, soft-keys, a keyboard, a microphone, or any combination thereof to provide data and communication inputs. Examples of the output device of the second user interface 838 can include a second display interface 840. The second display interface 840 can include a display, a projector, a video screen, a speaker, or any combination thereof.

The second control unit 834 can execute a second software 842 to provide the intelligence of the second device 106 of the electronic system 100. The second software 842 can operate in conjunction with the first software 826. The second control unit 834 can provide additional performance compared to the first control unit 812.

The second control unit 834 can operate the second user interface 838 to display information. The second control unit 834 can also execute the second software 842 for the other functions of the electronic system 100, including operating the second communication unit 836 to communicate with the first device 102 over the communication path 104.

The second control unit 834 can be implemented in a number of different manners. For example, the second control unit 834 can be a processor, an embedded processor, a microprocessor, hardware control logic, a hardware finite state machine (FSM), a digital signal processor (DSP), or a combination thereof.

The second control unit 834 can include a second control interface 844. The second control interface 844 can be used for communication between the second control unit 834 and other functional units in the second device 106. The second control interface 844 can also be used for communication that is external to the second device 106.

The second control interface 844 can receive information from the other functional units or from external sources, or can transmit information to the other functional units or to external destinations. The external sources and the external destinations refer to sources and destinations physically separate from the second device 106.

The second control interface 844 can be implemented in different ways and can include different implementations depending on which functional units or external units are being interfaced with the second control interface 844. For example, the second control interface 844 can be implemented with a pressure sensor, an inertial sensor, a microelectromechanical system (MEMS), optical circuitry, waveguides, wireless circuitry, wireline circuitry, or a combination thereof.

A second storage unit 846 can store the second software 842. The second storage unit 846 can also store the relevant information, such as advertisements, points of interest (POI), navigation routing entries, or any combination thereof. The second storage unit 846 can be sized to provide the additional storage capacity to supplement the first storage unit 814.

For illustrative purposes, the second storage unit 846 is shown as a single element, although it is understood that the second storage unit 846 can be a distribution of storage elements. Also for illustrative purposes, the electronic system 100 is shown with the second storage unit 846 as a single hierarchy storage system, although it is understood that the electronic system 100 can have the second storage unit 846 in a different configuration. For example, the second storage unit 846 can be formed with different storage technologies forming a memory hierarchal system including different levels of caching, main memory, rotating media, or off-line storage.

The second storage unit 846 can be a volatile memory, a nonvolatile memory, an internal memory, an external memory, or a combination thereof. For example, the second storage unit 846 can be a nonvolatile storage such as non-volatile random access memory (NVRAM), Flash memory, disk storage, or a volatile storage such as static random access memory (SRAM).

The second storage unit 846 can include a second storage interface 848. The second storage interface 848 can be used for communication between other functional units in the second device 106. The second storage interface 848 can also be used for communication that is external to the second device 106.

The second storage interface 848 can receive information from the other functional units or from external sources, or can transmit information to the other functional units or to external destinations. The external sources and the external destinations refer to sources and destinations physically separate from the second device 106.

The second storage interface 848 can include different implementations depending on which functional units or external units are being interfaced with the second storage unit 846. The second storage interface 848 can be implemented with technologies and techniques similar to the implementation of the second control interface 844.

The second communication unit 836 can enable external communication to and from the second device 106. For example, the second communication unit 836 can permit the second device 106 to communicate with the first device 102 over the communication path 104.

The second communication unit 836 can also function as a communication hub allowing the second device 106 to function as part of the communication path 104 and not limited to be an end point or terminal unit to the communication path 104. The second communication unit 836 can include active and passive components, such as microelectronics or an antenna, for interaction with the communication path 104.

The second communication unit 836 can include a second communication interface 850. The second communication interface 850 can be used for communication between the second communication unit 836 and other functional units in the second device 106. The second communication interface 850 can receive information from the other functional units or can transmit information to the other functional units.

The second communication interface 850 can include different implementations depending on which functional units are being interfaced with the second communication unit 836. The second communication interface 850 can be implemented with technologies and techniques similar to the implementation of the second control interface 844.

The first communication unit 816 can couple with the communication path 104 to send information to the second device 106 in the first device transmission 808. The second device 106 can receive information in the second communication unit 836 from the first device transmission 808 of the communication path 104.

The second communication unit 836 can couple with the communication path 104 to send information to the first device 102 in the second device transmission 810. The first device 102 can receive information in the first communication unit 816 from the second device transmission 810 of the communication path 104. The electronic system 100 can be executed by the first control unit 812, the second control unit 834, or a combination thereof. For illustrative purposes, the second device 106 is shown with the partition having the second user interface 838, the second storage unit 846, the second control unit 834, and the second communication unit 836, although it is understood that the second device 106 can have a different partition. For example, the second software 842 can be partitioned differently such that some or all of its function can be in the second control unit 834 and the second communication unit 836. Also, the second device 106 can include other functional units not shown in FIG. 8 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 820, although it is understood that the second device 102 can also operate the location unit 820.

Figure 9:
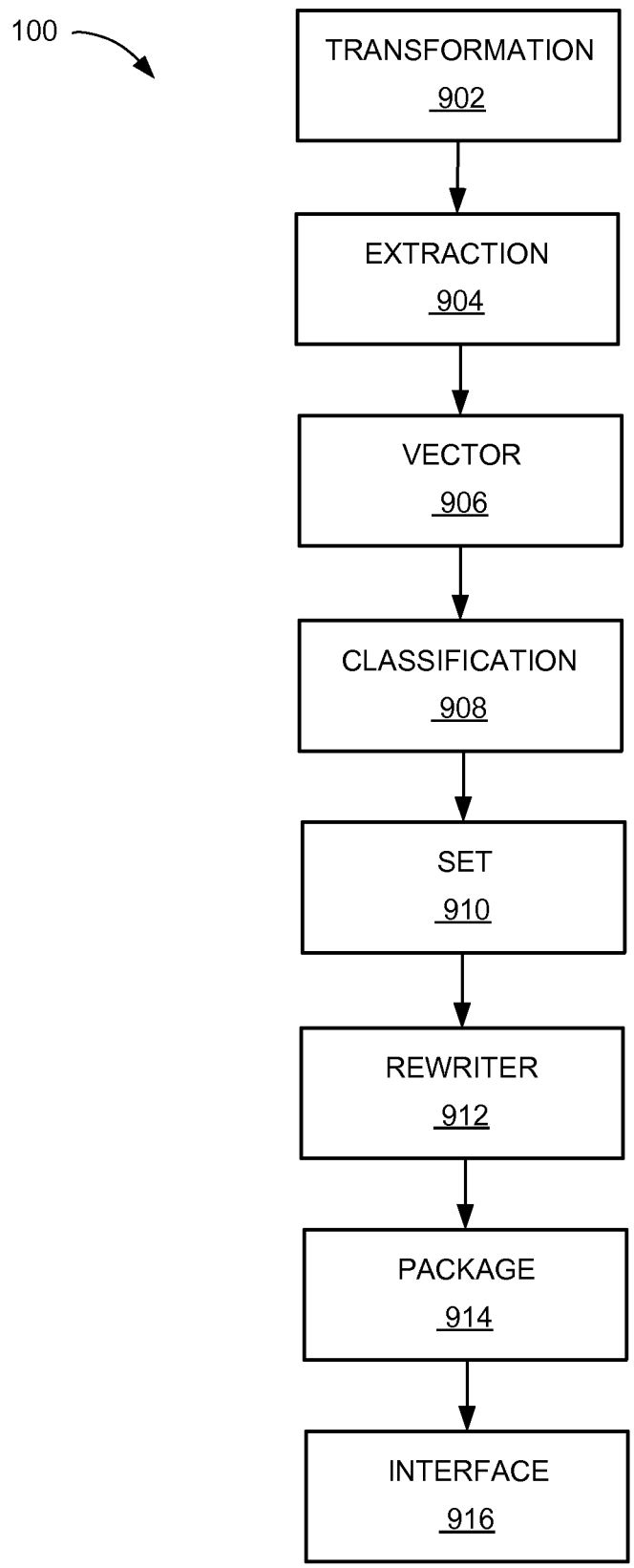
FIG. 9 is a control flow of the electronic system.

Referring now to FIG. 9, therein is shown a control flow of the electronic system 100 of FIG. 1. The electronic system 100 can include a transformation module 902. The transformation module 902 generates the file directory 206 of FIG. 2 including the file folder 208 of FIG. 2. For example, the transformation module 902 can generate the file directory 206 based on unpacking the package file 202 of FIG. 2 of the application 204 of FIG. 2.

For a specific example, the package file 202 can include a jar file, an iOS App Store Package, or a combination thereof. As an example, the transformation module 902 can generate the file directory 206 comprised of a plurality of the bytecode folder based on unpacking the package file 202. For further example, the transformation module 902 can generate the file directory 206 by performing instrumentation on the file directory 206 unpacked to convert the representation of the file directory 206 in a format accessible by the electronic system 100. The transformation module 902 can communicate the file directory 206 to an extraction module 904.

The electronic system 100 can include the extraction module 904, which can couple to the transformation module 902. The extraction module 904 extracts the feature 210 of FIG. 2. For example, the extraction module 904 can extract the feature 210 based on the feature definition 226 of FIG. 2. More specifically as an example, the feature 210 can use, access, implement, or a combination thereof the system component 212 of FIG. 2 defined in the feature definition 226.

The extraction module 904 can extract the feature 210 in a number of ways. As discussed above, the feature definition 226 provides a list of a plurality of the system component 212. For further example, the extraction module 904 can categorize and group the feature 210 based on the feature definition 226.

More specifically as an example, the feature definition 226 can include categories of the system component 212 representing the basic component 214 of FIG. 2, the permission component 216 of FIG. 2, the visual component 218 of FIG. 2, the source and sink component 220 of FIG. 2, the runtime permission check component 222 of FIG. 2, the keyword nomenclature 224 of FIG. 2, or a combination thereof. The extraction module 904 can extract the feature 210 based on scanning to identify the file folder 208 or a plurality of the file folder 208 in the file directory 206 including the feature 210 using or accessing the system component 212 defined in the feature definition 226.

For a specific example, the basic component 214 for the operating system, such as Android™, iOS™, or Windows™, can include activity, service, content provider, broadcast receiver, or a combination thereof. The extraction module 904 can extract the feature 210 based on identifying the file folder 208 using, accessing, or a combination thereof the basic component 214.

For a different example, the feature 210 can use the permission component 216 of the operation system. The permission component 216 can include, for example, INTERNET, ACCESS_NETWORK_STATE, ACCESS_WIFI_STATE, ACCESS_COARSE_LOCATION, ACCESS_FINE_LOCATION, WRITE_EXTERNAL_STORAGE, or a combination thereof. The extraction module 904 can extract the feature 210 by identifying the usage of the permission component 216 in the file folder 208.

For a different example, the feature 210 can implement the visual component 218. The feature 210 can provide user interface using the visual component 218 to display the external notification 404 of FIG. 4. For a specific example, the feature 210 can implement the visual component 218 by including the application programming interface, such as for example, the android.app, android widget, android.webkit, or a combination thereof in the file folder 208. The extraction module 904 can extract the feature 210 by identifying the usage of the visual component 218 in the file folder 208.

For a different example, the source and sink component 220 can include the information source and the information and sink. The information source can represent a system call that reads non-constant information from a shared source. The information sink can represent a system call that writes a piece of information to the shared resource. The extraction module 904 can extract the feature 210 by identifying the usage of the source and sink component 220 to make the system call.

For a different example, the feature 210 can use the application programming interface representing the runtime permission check component 222 to access the system component 212. For a specific example, the feature 210 can call the application programming interface with the format of android.content.Context.check*Permission where "*" can represent a wildcard character to include any character(s) between "check" and "Permission." The extraction module 904 can extract the feature 210 by identifying the usage of the runtime permission check component 222 in the file folder 208.

For a different example, the keyword nomenclature 224 can represent name of class, method, field, or a combination thereof including unique word, such as Facebook™ or Amazon™. The extraction module 904 can extract the feature 210 by identifying the usage of the keyword nomenclature 224 in the file folder 208. The extraction module 904 can communicate the feature 210 to a vector module 906.

The electronic system 100 can include the vector module 906, which can couple to the extraction module 904. The vector module 906 calculates the feature vector 230 of FIG. 2. For example, the vector module 906 can calculate the feature vector 230 of the file directory 206, the file folder 208, or a combination thereof based on comparing the feature 210 to the training data 228 of FIG. 2.

More specifically as an example, the vector module 906 can calculate the feature vector 230 by matching the feature 210 to the training data 228. The training data 228 can include the feature 210 classified according to the service type 232 of FIG. 2. The service type 232 can include the functionality component 234 of FIG. 2, the third party component 236 of FIG. 2, or a combination thereof. The training data 228 can be labeled by the service type 232 including the functionality component 234, the third party component 236, or a combination thereof.

The vector module 906 can match the feature 210 extracted from the file folder 208 to the feature 210 already classified in the training data 228. By matching, the vector module 906 can calculate the feature vector 230 by collecting the statics of how many instances of the feature 210 extracted within the file directory 206, the file folder 208, or a combination thereof matches with the feature 210 classified under the service type 232. The vector module 906 can communicate the feature vector 230 to a classification module 908.

The electronic system 100 can include the classification module 908, which can couple to the vector module 906. The classification module 908 generates the folder classification 238 of FIG. 2. For example, the classification module 908 can generate the folder classification 238 based on the feature vector 230. For another example, the classification module 908 can generate the folder classification 238 by classifying the file folder 208 as the functionality component 234 or the third party component 236.

The classification module 908 can generate the folder classification 238 in a number of ways. For example, the classification module 908 can generate the folder classification 238 based on the classification type 242 of FIG. 2. The classification type 242 can include the binary classification 244 of FIG. 2, the multiclass classification 246 of FIG. 2, or a combination thereof.

For a specific example, under the binary classification 244, the classification module 908 can generate the folder classification 238 by classifying the file directory 206, the file folder 208, or a combination thereof as either the service type 232 of the functionality component 234 or the third party component 236. For a different example, under the multiclass classification 246, the classification module 908 can generate the folder classification 238 by classifying the file directory 206, the file folder 208, or a combination thereof as the functionality component 234, the third party component 236, or a combination thereof.

For further example, the third party component 236 can include the notification component 248 of FIG. 2, the non-notification component 250 of FIG. 2, or a combination thereof. Under the multiclass classification 246, the classification module 908 can generate the folder classification 238 by classifying the file directory 206, the file folder 208, or a combination thereof as the functionality component 234, the notification component 248, the non-notification component 250, or a combination thereof.

For a different example, the classification module 908 can generate the folder classification 238 based on the feature vector 230 meeting or exceeding the vector threshold 240 of FIG. 2. As discussed above, the feature vector 230 can indicate the statistics of how many instances of the feature 210 in the file directory 206, the file folder 208, or a combination thereof matches the service type 232 of the functionality component 234, the third party component 236, or a combination thereof of the feature 210 in the training data 228.

The classification module 908 can generate the folder classification 238 representing the third party component 236 if the feature vector 230 meets or exceed the vector threshold 240. In contrast, the classification module 908 can also generate the folder classification 238 representing the functionality component 234 if the feature vector 230 meets or exceed the vector threshold 240.

For further example, the classification module 908 can generate the folder classification 238 representing the third party component 236 if the feature vector 230 indicates that there is at least one instance of the feature 210 in the file folder 208 matching the feature 210 of the training data 228 with the service type 232 of the third party component 236. More specifically as an example, the classification module 908 can generate the folder classification 238 based on the feature 210 classified as the third party component 236 using, accessing, implementing, or a combination thereof the system component 212 discussed above.

For a specific example, if there is one instance of the feature 210 matching the third party component 236 and uses, accesses, implements, or a combination thereof the system component 212 defined under the feature definition 226, the classification module 908 can generate the folder classification 238 representing the third party component 236 for the file directory 206, the file folder 208, or a combination thereof. In contrast, if the feature 210 matching the third party component 236 uses, accesses, implements, or a combination thereof the system component 212 not defined under the feature definition 226, the classification module 908 can generate the folder classification 238 representing the functionality component 234, the non-essential component 310 of FIG. 3, or a combination thereof for the file directory 206, the file folder 208, or a combination thereof.

For further example, the classification module 908 can generate the folder classification 238 based on classifying the file folder 208 according to the service type 232 representing the frontend service, the background service, or a combination thereof. As discussed above, if the file folder 208 includes the feature 210 that accesses long lasting thread function, then the file folder 208 can be classified as the folder classification 238 representing the background service. In contrast, if the file folder 208 includes the feature 210 that implements the user interface element, then the file folder 208 can be classified as the folder classification 238 representing the frontend service.

The classification module 908 can generate the folder classification 238 with machine learning. More specifically as an example, the classification module 908 can generate the folder classification 238 by automatically classifying the file folder 208 based on the service type 232 that the feature 210 accesses. The classification module 908 can communicate the folder classification 238 to a set module 910.

It has been discovered that the electronic system 100 generating the folder classification 238 improves the accuracy of classifying the file directory 206, the file folder 208, or a combination thereof. More specifically as an example, by generating the folder classification 238 based on the feature vector 230, the electronic system 100 can classify the file directory 206, the file folder 208, or a combination thereof without using the name of the package file 202. As a result, the electronic system 100 can accurately group the file directory 206, the file folder 208, or a combination thereof to improve the user's privacy operating the first device 102, the electronic system 100, or a combination thereof.

The electronic system 100 can include the set module 910, which can couple to the classification module 908. The set module 910 generates the component set 252 of FIG. 2. For example, the set module 910 can generate the component set 252 based on the folder classification 238.

More specifically as an example, the set module 910 can generate the component set 252 based on grouping the file directory 206, the file folder 208, or a combination thereof based on the folder classification 238. For example, the file folder 208 with the folder classification 238 of the functionality component 234 will be grouped by the set module 910 with other instances of the file folder 208 with a similar instance of the folder classification 238. In contrast, the file folder 208 with the folder classification 238 of the third party component 236 will be grouped by the set module 910 with other instances of the file folder 208 with a similar instance of the folder classification 238.

For further example, the file folder 208 with the folder classification 238 of the notification component 248 will be grouped by the set module 910 with other instances of the file folder 208 with the folder classification 238 representing the notification component 248. As an example, the file folder 208 with the folder classification 238 of the non-notification component 250 will be grouped by the set module 910 with other instances of the file folder 208 with the folder classification 238 representing the non-notification component 250.

The set module 910 can generate a plurality of the component set 252 including the file directory 206, the file folder 208, or a combination thereof grouped according to the same instance of the folder classification 238. The set module 910 can communicate the component set 252 to a rewriter module 912.

The electronic system 100 can include the rewriter module 912, which can couple to the set module 910. The rewriter module 912 generates the replacement component 256 of FIG. 2. For example, the rewriter module 912 can generate the replacement component 256 including the replacement type 302 of FIG. 3 of the wrapper function 304 of FIG. 3, the replacement notification 402 of FIG. 4, the fake information 502 of FIG. 5, or a combination thereof.

The rewriter module 912 can generate the replacement component 256 in a number of ways. For example, the rewriter module 912 can generate the replacement component 256 based on the resource type 258 of FIG. 2, the component set 252, or a combination thereof. More specifically as an example, the rewriter module 912 can generate the replacement component 256 for the component set 252 classified with the folder classification 238 of the third party component 236 to replace the third party component 236.

The rewriter module 912 can maintain a list of the resource type 258 for which instance of the resource type 258 to control. For further example, the rewriter module 912 can generate the replacement component 256 for the service type 232 accessing all instances of the resource type 258 or some instances of the resource type 258, such as Internet, location, contact, calendar, phone identification, account/profile, or a combination thereof.

For a specific example, the rewriter module 912 can generate the replacement component 256 for the component set 252 accessing the resource type 258 including Internet, location, contact, calendar, phone identification, account/profile, or a combination thereof. As discussed, the component set 252 can include the third party component 236. The third party component 236 can represent a method, such as "Location LocationManager.getLastKnownLocation(String provider), accessing the resource type 258 representing location of the first device 102. The rewriter module 912 can generate the replacement component 256 representing the wrapper function 304 to control the access of the resource type 258 representing the location by the third party component 236.

More specifically as an example, the rewriter module 912 can generate the wrapper function 304 representing a method, such as "AdSeaCat.queryController(String appName, String resourceType, String componentType)," to wrap the third party component 236 representing Location LocationManager.getLastKnownLocation(String provider) ." Based on the wrapper function 304, the user of the electronic system 100 can control whether to allow the application 204 to access the resource type 258. Details regarding the control will be discussed below.

It has been discovered that the electronic system 100 generating the wrapper function 304 improves the protection of the user's privacy. By generating the wrapper function 304 to replace the third party component 236, the electronic system 100 can prohibit external sources, such as the third party provider, to access private information on the first device 102. As a result, the electronic system 100 can reduce the exposure of the user's privacy for safer operation of the first device 102, the electronic system 100, or a combination thereof.

For further example, the rewriter module 912 can generate the replacement component 256 representing the replacement notification 402. More specifically as an example, the replacement notification 402 can replace the external notification 404 based on the permission level 262 of FIG. 2. If the permission level 262 indicates that the user did not permit the third party component 236 to display the external notification 404, the replacement notification 402 can be displayed instead by the application 204.

For example, in preparation of the permission level 262 indicated as no permission to display the external notification 404, the rewriter module 912 can generate the replacement notification 402. More specifically as an example, the rewriter module 912 can generate the replacement notification 402 representing a null pointer. The application 204 with the replacement component 256 can display the replacement notification 402 instead of the external notification 404 displayed by the third party component 236. By displaying the replacement notification 402 with the null pointer, the first device 102 can display a blank section instead of an advertisement, for example.

It has been discovered that the electronic system 100 generating the replacement notification 402 can improve the user experience operating the first device 102, the electronic system 100, or a combination thereof. By generating the replacement notification 402, the electronic system 100 can eliminate the external notification 404 cluttering the display interface of the first device 102. As a result, the user can focus on the content pertinent to the user for enhanced user experience of the first device 102, the electronic system 100, or a combination thereof.

For a different example, the rewriter module 912 can generate the fake information 502 to modify the external notification 404. In the original configuration, the third party component 236 can access the resource type 258 representing the location to determine the current location of the first device 102. Based on the resource type 258, the third party component 236 can display the external notification 404 including the current location of the first device 102.

However, the rewriter module 912 can generate the fake information 502 to disguise the current location of the first device 102 to the third party provider. Based on the fake information 502, the third party provider can provide the external notification 404 including the fake information 502. More specifically as an example, the current location of the first device 102 can represent California. The fake information 502 can represent New York. Since the third party provider is unaware of the current location, the third party provider can provide the external notification 404 including New York for the fake information 502 to display with the external notification 404.

It has been discovered that the electronic system 100 generating the fake information 502 can improve the protection of the user's privacy. By generating the fake information 502, the electronic system 100 can prohibit external sources, such as the third party provider, to access private information on the first device 102. As a result, the electronic system 100 can reduce the exposure of the user's privacy for safer operation of the first device 102, the electronic system 100, or a combination thereof.

For another example, similar to the discussion for the resource type 258, the rewriter module 912 can generate the replacement component 256 based on the resource subtype 306 of FIG. 3. The resource subtype 306 can include uniform resource locator (URL), the geographic coordinates, or a combination thereof. The rewriter module 912 can generate the replacement component 256 based on the permission level 262 to replace the resource type 258, the resource subtype 306, or a combination thereof accessed by the third party component 236.

For a different example, the rewriter module 912 can generate the replacement component 256 based on the blacklist 308 of FIG. 3. More specifically as an example, the blacklist 308 can include data unpermitted by the functionality component 234 to share with the third party component 236. The data unpermitted can represent function signature. The rewriter module 912 can generate the replacement component 256 to block the data unpermitted from being transferred between the functionality component 234 and the third party component 236. The rewriter module 912 can communicate the replacement component 256 to a package module 914.

The electronic system 100 can include the package module 914, which can couple to the rewriter module 912. The package module 914 generates the repackage file 260 of FIG. 2. For example, the package module 914 can generate the repackage file 260 including the functionality component 234, the replacement component 256, or a combination thereof.

More specifically as an example, the package module 914 can generate the repackage file 260 based on packaging the file directory 206, the file folder 208, or a combination thereof including the functionality component 234, the replacement component 256 replacing the third party component 236, or a combination thereof. For a different example, the package module 914 can generate the repackage file 260 including the functionality component 234, the replacement component 256, the third party component 236, or a combination thereof.

The package module 914 can generate the repackage file 260 using a private key. If the repackage file 260 includes a control function and is signed using the private key, the user of the repackage file 260 can be detectable. For further example, in order for the repackage file 260 to access the control interface 254, the configuration file, such as a manifest file, can require a unique URI, a permission, or a combination thereof. The permission can allow the control interface 254 to access the repackage file 260. By identifying the usage of the unique URI and the permission, the user of the repackage file 260 can be detectable. The first device 102 can install the repackage file 260 to run the application 204 that has been modified on the first device 102. The package module 914 can communicate the repackage file 260 to an interface module 916.

The electronic system 100 can include the interface module 916, which can couple to the package module 914. The interface module 916 provides access to the first device 102. For example, the interface module 916 can provide access to the functionality component 234, the replacement component 256, the third party component 236, or a combination thereof. The interface module 916 can represent the control interface 254 of FIG. 2.

The interface module 916 can provide access in a number of ways. For example, the interface module 916 can provide a customized access to the functionality component 234, the replacement component 256, the third party component 236, or a combination thereof based on the permission level 262. The interface module 916 can receive the input 702 of FIG. 7 including a manual input, an audio input, gesture, or a combination thereof. The input 702 can change the permission level 262 to customize the access to the resource type 258. More specifically as an example, by customizing the access, the electronic system 100 can customize an operation of the application 204 running on the first device 102.

For example, the input 702 can change the permission level 262 to deny the third party component 236 from accessing the resource type 258 representing the current location of the first device 102. As a result, the interface module 916 can change the access configuration 602 of FIG. 6 for the resource type 258. The access configuration 602 can represent lock/unlock icon, on/off, switch, or a combination thereof. By changing the permission level 262, the interface module 916 can change the access configuration 602 from unlock to lock for lock/unlock icon, from on to off for on/off switch, or a combination thereof.

By changing the permission level 262, the access configuration 602, or a combination thereof, the application 204 can execute the replacement component 256 instead of the third party component 236, for example. More specifically as an example, the replacement component 256 can represent the wrapper function 304 to deny access to the resource type 258 as indicated by the permission level 262, the access configuration 602, or a combination thereof. For a different example, the replacement component 256 can provide the replacement notification 402 instead of the external notification 404 to block an advertisement, for example, to be displayed by the application 204 on the first device 102. For another example, the replacement component 256 can provide the fake information 502 as part of the external notification 404 to disguise the information from the resource type 258 being accessed by the third party provider.

For further example, the interface module 916 can change the permission level 262, the access configuration 602, or a combination thereof based on the context 504 of FIG. 5 similarly as to the input 702 discussed above. For example, the context 504 can represent that the user is at a client site. The permission level 262 can be set so that resource type 258 representing location cannot be shared when the context 504 indicates that the first device 102 is detected at the client site. Based on the context 504, the interface module 916 can change the permission level 262, the access configuration 602, or a combination thereof for the application 204 to execute the replacement component 256 instead of the third party component 236.

It has been discovered that the electronic system 100 providing the control interface 254 to change the access configuration 602 based on the permission level 262, the context 504, or a combination thereof improves the granular control for protecting the user's privacy operating the first device 102, the electronic system 100, or a combination thereof. By changing the access configuration 602, the electronic system 100 can prohibit external sources, such as the third party provider, to access private information on the first device 102. As a result, the electronic system 100 can reduce the exposure of the user's privacy for safer operation of the first device 102, the electronic system 100, or a combination thereof.

The physical transformation from switching between one instance of the context 504 to another instance of the context 504 results in the movement in the physical world, such as people using the first device 102, based on the operation of the electronic system 100. As the movement in the physical world occurs, the movement itself creates additional information that is converted back into changing the permission level 262, the access configuration 602, the replacement component 256, or a combination thereof for the continued operation of the electronic system 100 and to continue movement in the physical world.

The first software 826 of FIG. 8 of the first device 102 of FIG. 8 can include the electronic system 100. For example, the first software 826 can include the transformation module 902, the extraction module 904, the vector module 906, the classification module 908, the set module 910, the rewriter module 912, the package module 914, and the interface module 916.

The first control unit 812 of FIG. 8 can execute the first software 826 for the transformation module 902 to generate the file directory 206. The first control unit 812 can execute the first software 826 for the extraction module 904 to extract the feature 210. The first control unit 812 can execute the first software 826 for the vector module 906 to calculate the feature vector 230.

The first control unit 812 can execute the first software 826 for the classification module 908 to generate the folder classification 238. The first control unit 812 can execute the first software 826 for the set module 910 to generate the component set 252. The first control unit 812 can execute the first software 826 for the rewriter module 912 to generate the replacement component 256.

The first control unit 812 can execute the first software 826 for the package module 914 to generate the repackage file 260. The first control unit 812 can execute the first software 826 for the interface module 916 to provide the access configuration 602 to the functionality component 234, the replacement component 256, the third party component 236, or a combination thereof.

The second software 842 of FIG. 8 of the second device 106 of FIG. 8 can include the electronic system 100. For example, the second software 842 can include the transformation module 902, the extraction module 904, the vector module 906, the classification module 908, the set module 910, the rewriter module 912, the package module 914, and the interface module 916.

The second control unit 834 of FIG. 8 can execute the second software 842 for the transformation module 902 to generate the file directory 206. The second control unit 834 can execute the second software 842 for the extraction module 904 to extract the feature 210. The second control unit 834 can execute the second software 842 for the vector module 906 to calculate the feature vector 230.

The second control unit 834 can execute the second software 842 for the classification module 908 to generate the folder classification 238. The second control unit 834 can execute the second software 842 for the set module 910 to generate the component set 252. The second control unit 834 can execute the second software 842 for the rewriter module 912 to generate the replacement component 256.

The second control unit 834 can execute the second software 842 for the package module 914 to generate the repackage file 260. The second control unit 834 can execute the second software 842 for the interface module 916 to provide the access configuration 602 to the functionality component 234, the replacement component 256, the third party component 236, or a combination thereof.

The electronic system 100 can be partitioned between the first software 826 and the second software 842. For example, the second software 842 can include the transformation module 902, the extraction module 904, the vector module 906, the classification module 908, the set module 910, the rewriter module 912, and the package module 914. The second control unit 834 can execute modules partitioned on the second software 842 as previously described.

The first software 826 can include the interface module 916. Based on the size of the first storage unit 814, the first software 826 can include additional modules of the electronic system 100. The first control unit 812 can execute the modules partitioned on the first software 826 as previously described.

The first control unit 812 can operate the first communication interface 828 of FIG. 8 to communicate the file directory 206 including the file folder 208, the feature 210, the feature vector 230, the folder classification 238, the component set 252, the replacement component 256, the repackage file 260, or a combination thereof to or from the second device 106. The first control unit 812 can operate the first software 826 to operate the location unit 820. The second communication interface 850 of FIG. 8 to communicate the file folder 208, the feature 210, the feature vector 230, the folder classification 238, the component set 252, the replacement component 256, the repackage file 260, or a combination thereof to or from the first device 102.

The first control unit 812 can operate the first user interface 818 of FIG. 8 representing the interface module 916 to present the permission level 262, the access configuration 602, the functionality component 234, the third party component 236, the replacement component 256, or a combination thereof on the first device 102. The second control unit 834 can operate the second user interface 838 of FIG. 8 representing the interface module 916 to present the permission level 262, the access configuration 602, the functionality component 234, the third party component 236, the replacement component 256, or a combination thereof on the second device 106. For further example, the first user interface 818, the second user interface 838, or a combination thereof can present the application 204 including a plurality of the service type 232 with the permission level 262.

The electronic system 100 describes the module functions or order as an example. The modules can be partitioned differently. For example, the transformation module 902 and the extraction module 904 can be combined. Each of the modules can operate individually and independently of the other modules. Furthermore, data generated in one module can be used by another module without being directly coupled to each other. For example, the classification module 908 can receive the file directory including the file folder 208 directly from the transformation module 902. The word "communicating" can represent sending, receiving, or a combination thereof.

The modules described in this application can be hardware implementation or hardware accelerators in the first control unit 812 or in the second control unit 834. The modules can also be hardware implementation or hardware accelerators within the first device 102 or the second device 106 but outside of the first control unit 812 or the second control unit 834, respectively as depicted in FIG. 8. However, it is understood that the first device 102, the second device 106, or a combination thereof can collectively refer to all hardware accelerators for the modules. Furthermore, the first device 102, the second device 106, or a combination thereof can be implemented as software, hardware, or a combination thereof.

The modules described in this application can be implemented as instructions stored on a non-transitory computer readable medium to be executed by the first device 102, the second device 106, or a combination thereof. The non-transitory computer medium can include the first storage unit 814, the second storage unit 846 of FIG. 8, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

Figure 10:
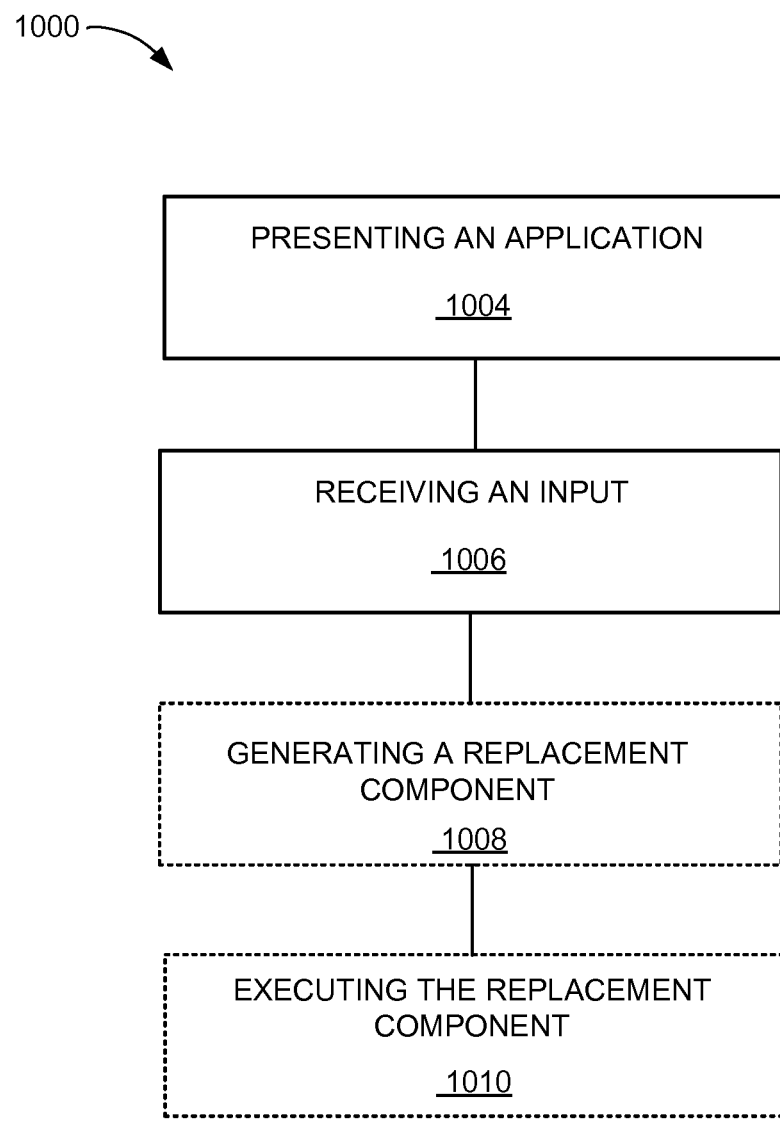
FIG. 10 is an exemplary flow chart of a method of operation of the electronic system of FIG. 1 in a further embodiment.

Referring now to FIG. 10, therein is shown an exemplary flow chart of a method 700 of operation of the electronic system 100 of FIG. 1 in a further embodiment. The exemplary flow chart 1000 includes: presenting an application coupled to an access configuration with a control unit to customize a permission level for a service type in a block 1002; and receiving an input for changing the permission level of the service type for accessing a resource type for customizing an operation of the application on a device in a block 1004.

The exemplary flow chart 1000 can further include: generating a replacement component with the control unit based on the permission level for accessing the resource type in a block 1006; and executing the replacement component for providing a replacement notification, a fake information, or a combination thereof to present on the device in a block 1008.

It has been discovered that the electronic system 100 generating the replacement component 256 of FIG. 2 based on the resource type 258 of FIG. 2 to access the resource type 258 improves the user's privacy for operating the first device 102, the electronic system 100, or a combination thereof. The electronic system 100 can provide the access configuration 602 of FIG. 6 to customize the permission level 262 of FIG. 2 for controlling the third party component 236 of FIG. 2 from accessing the resource type 258. By generating the replacement component 256, the electronic system 100 can execute the replacement component 256 instead of the third party component 236 to access the resource type 258. As a result, the electronic system 100 can provide the replacement notification 402 of FIG. 4, the fake information 502 of FIG. 5, or a combination thereof for protecting the user's privacy for safer operation of the first device 102, the electronic system 100, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a control unit including a processor configured to:
extract a feature, wherein the feature accesses a system component representing a first resource of an operating system,
classify the feature as a third party component for controlling the feature from accessing the system component, wherein the third party component represents a second resource provided by an external source,
generate a replacement component including a fake information, incorporated with an external notification and a replacement notification thereof based on a permission level for accessing a resource type and a resource subtype for accessing the resource subtype for replacing the third party component, and
a user interface including a display, coupled to the control unit, configured to:
present an application, including the replacement component to be executed, coupled to an access configuration to customize the permission level for a service type, and
receive an input for changing the permission level of the service type for accessing the resource type for customizing an operation of the application on a device.

2. The system as claimed in claim 1 wherein the control unit is configured to extract the feature defined in a feature definition based on scanning a file folder in a file directory unpacked from a package file of the application.

3. The system as claimed in claim 1 wherein the control unit is configured to calculate a feature vector based on matching the feature extracted to a training data for classifying a file directory, a file folder, or a combination thereof.

4. The system as claimed in claim 1 wherein the control unit is configured to generate a folder classification based on a feature vector for classifying a file directory, a file folder, or a combination thereof according to the service type.

5. The system as claimed in claim 1 wherein the control unit is configured to generate a component set based on a folder classification for grouping a file directory, a file folder, or a combination thereof according to the service type.

6. The system as claimed in claim 1 wherein the control unit is configured to generate a wrapper function for replacing the third party component for accessing the resource type.

7. The system as claimed in claim 1 wherein the control unit is configured to generate the replacement notification for replacing the external notification being presented on the device.

8. The system as claimed in claim 1 wherein the control unit is configured to generate a repackage file including a functionality component, the third party component, the replacement component, or a combination thereof for installing on the device.

9. The system as claimed in claim 1 wherein the control unit is configured to execute the replacement component instead of the third party component for providing the replacement notification, the fake information, or a combination thereof.

10. The system as claimed in claim 1 wherein the control unit is configured to generate the replacement component based on a blacklist for blocking unpermitted access.

11. The system as claimed in claim 1 wherein the control unit is configured to change the permission level, the access configuration, or a combination thereof based on a context of the input made.

12. A method of operation of an electronic system comprising:
   extracting a feature, wherein the feature accesses a system component representing a first resource of an operating system;
   classifying the feature as a third party component for controlling the feature from accessing the system component, wherein the third party component represents a second resource provided by an external source;
   generating a replacement component including a fake information, incorporated with an external notification, and a replacement notification based on a permission level for accessing a resource type and a resource subtype for accessing the resource subtype for replacing the third party component;
   presenting an application, including the replacement component to be executed, coupled to an access configuration with a control unit to customize the permission level for a service type; and
   receiving an input for changing the permission level of the service type for accessing the resource type for customizing an operation of the application on a device.

13. The method as claimed in claim 12 wherein extracting the feature includes extracting the feature defined in a feature definition based on scanning a file folder in a file directory unpacked from a package file of the application.

14. The method as claimed in claim 12 further comprising calculating a feature vector based on matching the feature extracted to a training data for classifying a file directory, a file folder, or a combination thereof.

15. The method as claimed in claim 12 further comprising generating a folder classification based on a feature vector for classifying a file directory, a file folder, or a combination thereof according to the service type.

16. The method as claimed in claim 12 further comprising generating a component set based on a folder classification for grouping a file directory, a file folder, or a combination thereof according to the service type.

17. The method as claimed in claim 12 further comprising executing the replacement component instead of the third party component for providing the replacement notification, the fake information, or a combination thereof.

18. A non-transitory computer readable medium including instructions for execution by a control unit comprising:
   extracting a feature, wherein the feature accesses a system component representing a first resource of an operating system;
   classifying the feature as a third party component for controlling the feature from accessing the system component, wherein the third party component represents a second resource provided by an external source;
   generating a replacement component a fake information, incorporated with an external notification, and a replacement notification based on a permission level for accessing a resource type and a resource subtype for accessing the resource subtype for replacing the third party component;
   presenting an application, including the replacement component to be executed, coupled to an access configuration to customize the permission level for a service type; and
   receiving an input for changing the permission level of the service type for accessing the resource type for customizing an operation of the application on a device.

19. The non-transitory computer readable medium as claimed in claim 18 wherein extracting the feature includes extracting the feature defined in a feature definition based on scanning a file folder in a file directory unpacked from a package file of the application.

20. The non-transitory computer readable medium as claimed in claim 18 further comprising calculating a feature vector based on matching the feature extracted to a training data for classifying a file directory, a file folder, or a combination thereof.

21. The non-transitory computer readable medium as claimed in claim 18 further comprising generating a folder classification based on a feature vector for classifying a file directory, a file folder, or a combination thereof according to the service type.

22. The non-transitory computer readable medium as claimed in claim 18 further comprising generating a component set based on a folder classification for grouping a file directory, a file folder, or a combination thereof according to the service type.

23. The non-transitory computer readable medium as claimed in claim 18 further comprising executing the replacement component instead of the third party component for providing the replacement notification, the fake information, or a combination thereof.

* * * * *